United States Patent Office 3,379,837
Patented Apr. 23, 1968

3,379,837

CENTRAL ENERGY SIMPLEX INTERCOMMUNICATION SYSTEM CAPABLE OF PAGING AND CONFERENCE CALLS

Rudolf Weihser, Graz, Styria, Austria, assignor to International Standard Electric Corporation Filed Sept. 29, 1964, Ser. No. 400,056
3 Claims. (Cl. 179—40)

ABSTRACT OF THE DISCLOSURE

A central energy simplex intercommunication system capable of paging and conference calls. Each of the plurality of stations utilizes a single blocking relay that disconnects the talking transducer of the station responsive to the testing relay at the central control if the engaging key at the station is not operated. The central control circuit uses three relays. The energizing relay is responsive to the engaging key to energize the common amplifier. The auxiliary relay is responsive to the inhibiting circuit at the stations to actuate the testing relay.

Figure 1:
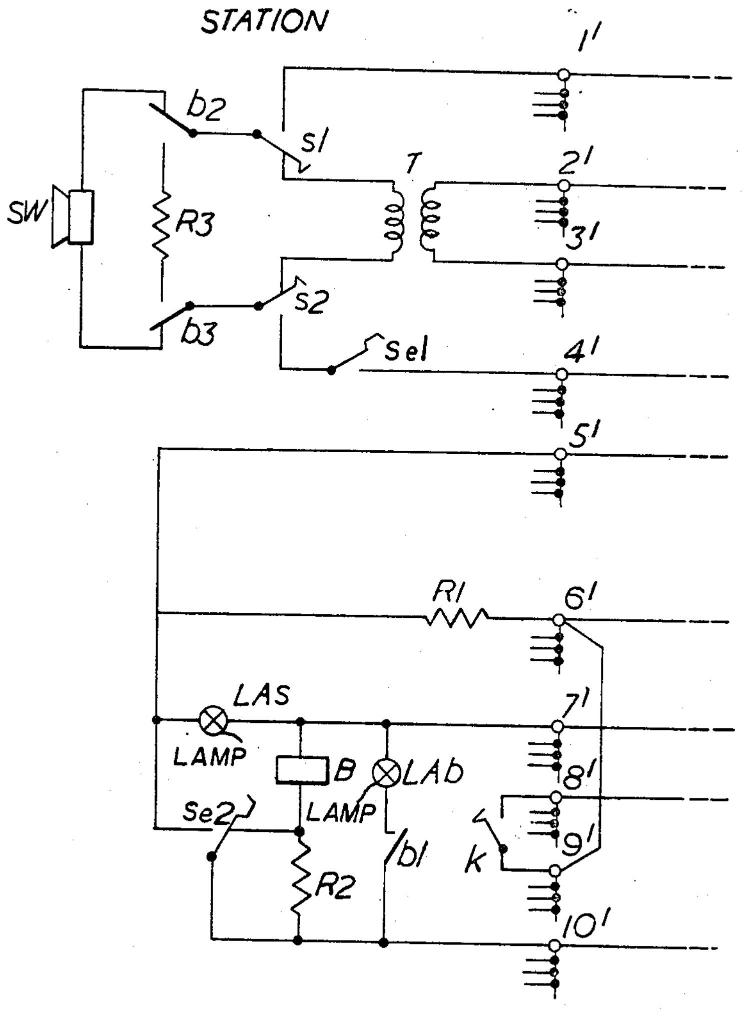

This invention relates to intercommunication systems and in particular to circuits for a simplex channel intercommunication system each comprising a central amplifier unit and several stations. Efficient and versatile intercommunication systems are constantly being sought. Accordingly, an object of the invention is to provide the circuit arrangement comprising a central unit, preferably wall mounted containing an amplifier, a voltage source, relays, and several stations. The stations are provided with suitable control members (keys) for engaging the stations and for talking and, if desired, for additional functions, such as conference connections or group calls. Each station can establish a talking connection to any other.

A further object of the invention is to provide ring call intercommunication systems.

For a ring call, the corresponding control member (key) for energizing the system is operated. Then the voice of the caller is heard at all stations of the system. The called person presses the station-engaging control member (key) in the nearest station and is connected to the calling party.

Yet another object of the invention is to provide visual or audio signalling means. For instance, a green signal lamp, will be lighted in the connected station. A corresponding "busy" lamp, for instance a red signal lamp, will light in all other stations, which are prevented from talking when the particular talking connection has been established.

Yet a further object of this invention is to provide private intercommunication systems. The calling and called stations are connected by a simplex channel. The person who is talking presses the control member (key) for talking. All other stations are blocked and cannot hear the conversation or interfere with or interrupt the same.

A feature of this invention is that at the end of the conversation, if the two station-engaging control members (keys) are not returned to their normal position alarms are operated. For example, a lamp lights at the calling station. If the keys of a station remain operated, that station will receive the next call. The caller can then request the forgetful operator to release his control member (key). The lamp will then be extinguished so that the ring call can be effected.

A further object of this invention is to provide simple means for connecting stations on a non-calling basis. By a simple circuit modification, consisting in the omission of a connecting lead any desired station can be made "non-calling." This station cannot call or establish a conversation but can be called and conduct a simplex conversation like any other. The operation is the same is in any other station.

Another object of this invention is to provide conference call or group call facilities. To conduct a conference conversation, the station-engaging control member (key) is operated first. Then the control member (key) for talking and the control member (key) for conference connections are operated. The desired participants of the conference are called, the control member (key) for talking is released, and the control member (key) for conference connections is held in its operated position until the called participants have reported. The desired stations are now connected in conference and all others are blocked.

If a group call is desired, the stations may be arranged in one or more call groups. In this case, the control member (key) for conference connections serves as a group call control member (key) and just as in a conference connection is actuated at the same time as the control member (key) for talking. This control member must be released when the called partner has reported. A normal simplex-type conversation is then conducted.

A certain circuit component in the central unit ensures that a certain group ring call is heard only by a certain group, e.g., a department. A plurality of groups may be formed. Only one group call can be controlled from each station in addition to the general ring call.

A group call will signal only the stations of the group concerned rather than all stations.

According to the invention the circuit arrangement for a simplex channel intercommunication system comprising a central amplifier unit is characterized in that the stations are connected in parallel to the central amplifier unit. Each station has a series connection comprising a station-engaging contact. An auxiliary relay in the central amplifier unit serves for applying the voltage of a central voltage source to said series connection. A resistor of a value so related to the resistance of the auxiliary relay is serially connected that the relay does not respond. However, a parallel connection of at least two such resistors established by the operation of the station-engaging contacts of at least two stations enables a response of the auxiliary relay. The central amplifier unit comprises a relay circuit controlled by the auxiliary relay. Each station comprises a blocking relay which is controlled by said relay circuit and is prepared to respond when the station-engaging contact is in position of rest. The blocking relay has contacts which are operated to disconnect the sound transducer of the respective station.

The circuit arrangement according to the invention, is further characterized in that the relay circuit controlled by the auxiliary relay comprises a series connection of another relay with a make contact. The series connection is connected in parallel to a series connection of the auxiliary relay, a break contact of the other relay, a make contact of the auxiliary relay. The last named make contact is connected to the other terminal of the voltage source, and a make contact of the other relay. The last named make contact is connected to one terminal of the voltage source.

Further according to the invention, the blocking relay in each station is connected in series with a further resistor and the station-engaging contact in position of rest short-circuits the further resistor and when operated connects the further resistance in circuit so that the blocking relay in the stations which are connected to each other by operated station engaging contacts remains deenergized whereas the blocking relay is energized in those stations in which the station-engaging contacts are in position of rest.

Further according to the invention, a series connection of a lamp and a make contact of the blocking relay is connected in parallel to the series connection of the blocking relay and the further resistor so that the lamp is energized when the station is blocked by a conversation in progress.

According to a modification of the invention, a lamp is connected between the resistor and that side of the blocking relay which is opposite to the further resistor so that the lamp is energized when this station blocks an establishment of a talking connection.

Further according to the invention, at least one talking contact is provided, by which the sound transducer can be connected to the input of the amplifier of the central amplifier unit for talking and to the output of said amplifier for listening.

For making conference arrangements, the invention provides a make contact, which applies to the junction between the resistor and the auxiliary relay a voltage which is equal to the voltage applied to the other side of the auxiliary relay so that the latter is not energized until all stations participating in the conference have been connected together and the contact for conference connections has been opened.

In a further development of the invention, the central amplifier unit comprises an energizing relay, which enables an energization of the amplifier in response to the operation of the station-engaging contact in those stations which have a lead to this energizing relay whereas the operation of the station-engaging contact in the stations which have no connection to this energizing relay cannot cause an energization of the amplifier.

Finally, the invention makes provision for preventing a call of the calling station from being heard in all stations because a terminal of the conference contact of a certain group of associated stations is connected to a group output of the central amplifier unit and a group relay associated with this group is connected to this output and to one terminal of the voltage source, break contacts of the group relays are connected to the multiplied terminal, which is connected to the other terminal of the voltage source when the station is engaged, and make contacts of these group relays are connected in parallel to the contact of the auxiliary relay, whereas the galvanic connection to the junction between the resistor and the conference contact is opened.

Figure 2:
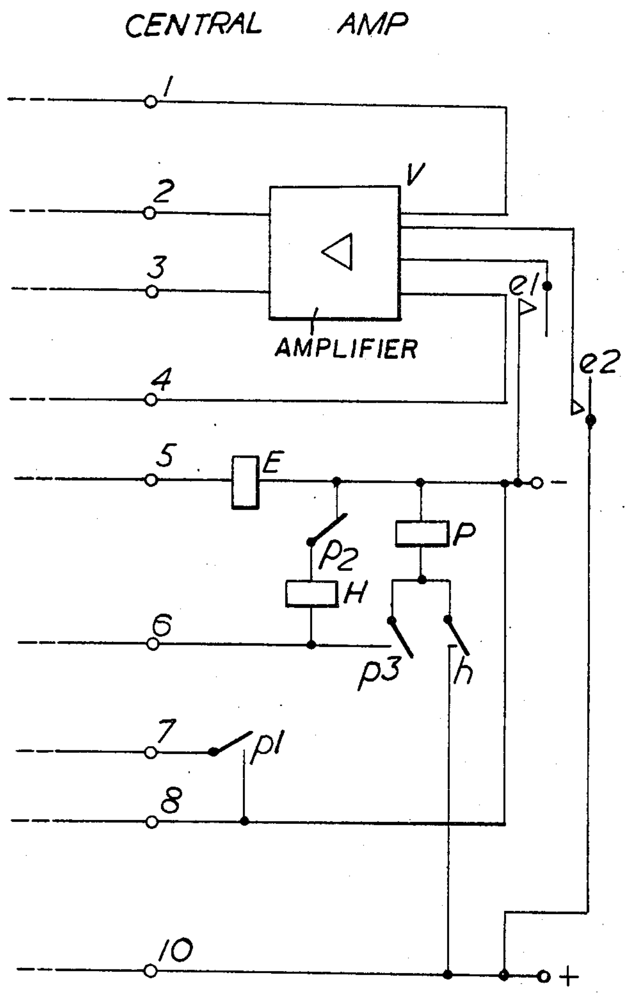

The above mentioned and other features of this invention and the manner of obtaining them will become more apparent, and the invention itself will be best understood by reference to the following description of an embodiment of the invention taken in conjunction with the accompanying drawings, in which:

FIG. 1 schematically shows a station;

FIG. 2 schematically shows the central amplifier unit; and

Figure 3:
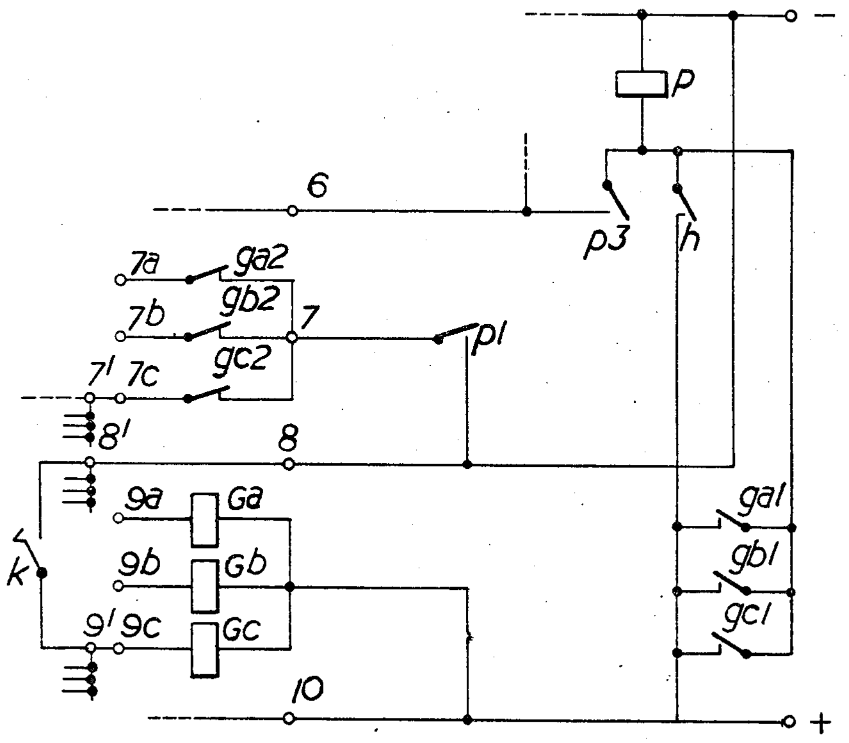

FIG. 3 schematically shows a circuit arrangement for a group call.

The station of FIG. 1 is connected to the central amplifier unit shown in FIG. 2. The arrangement according to the invention comprises, e.g., a central amplifier unit as shown in FIG. 2 and a plurality of identical stations as shown in FIG. 1. Terminals 1' to 10' of the stations are connected in parallel to the terminals 1 to 10 of the central amplifier unit.

V is the amplifier of the central amplifier unit, E the energizing relay which enables the energization of the amplifier under control of any authorized station. H is the auxiliary relay and P is the testing relay of the central amplifier unit.

The sound transducer SW of the station is a loudspeaker which is alternately used as a microphone and as a loudspeaker, depending on the direction of speech. Keys *se*1 and *se*2 are contacts of the station-engaging key. Keys *s*1 and *s*2 are contacts of the talking key. Key *k* is the contact of the conference key. Relay B is the blocking relay. Lamps LA*s* is the lamp which indicates that the station is engaged and lamp LA*b* is the lamp indicating that the station is blocked.

When it is desired to make a so-called ring call from a station, the station-engaging key must be pressed first. This key is preferably self-holding. This will close the contact *se*1 and change over the contact *se*2.

When considering the current paths, the terminals 1' to 10' of FIG. 1 must be considered multiplied according to the number of stations in the system.

The operation of the station-engaging key establishes the following circuit:

Positive terminal of the central voltage source, terminal 10, terminal 10', contact *se*2, terminal 5', terminal 5, relay E, negative terminal of the central voltage source.

The operation of relay E causes the energization of the amplifier V of the central amplifier unit over the circuit that extends from the positive and negative terminals through contacts *e*2, *e*1, respectively, to amplifier V.

The talking key must now be pressed in the station from which a call is to be made. This causes the contacts *s*1 and *s*2 to be changed over. The sound transducer SW was previously coupled by the transformer T to the output of the amplifier V and is now connected by the contacts *s*1 and *s*2 to the input of the amplifier V. The operator of this station can now use the sound transducer SW as a microphone and can talk to all stations of the system (calling). In the other stations of the system, the contacts are in the position of rest shown in FIG. 1 so that all sound transducers SW are connected to the output of the central amplifier V. As soon as the calling person speaks into his sound transducer, he will be heard at all other connected stations out of their sound transducer SW, just as in an announcing loudspeaker system.

The person who is called, e.g., by name, goes to the nearest station, presses the station-engaging key and then the talking key and speaks into his sound transducer SW. Before he speaks, the talking key at the calling station has been released.

The relatively simple operations described in the preceding paragraph result in substantial changes in the circuit arrangement.

The change-over of the station-engaging contacts *se*2 in the two stations connected by the pressing of the station-engaging keys connects the resistor R1 of each of these stations in parallel between the terminals 10' and 6'. The resistor R1 has such a value that with a single resistor R1 in circuit the auxiliary relay H of the central amplifier unit the voltage drop across the single series resistor precludes operation of relay H. When two such resistors R1 are connected in parallel, the potential will be changed to energize the relay H in the following circuit:

Positive terminal of the central voltage source, terminal 10, terminal 10', contact *se*2 and resistor R1 of the calling station in a parallel connection with contact *se*2 and resistor R1 of the called station, terminal 6', terminal 6, auxiliary relay H, contact *p*2, negative terminal of the central voltage source.

The auxiliary relay H closes its contact *h* to energize the relay P in the following circuit:

Positive terminal of the central voltage source, contact *h*, relay P, negative terminal of the central voltage source.

The operation of relay P causes the contact *p*2 to open so that the auxiliary relay H drops out whereas the contact *p*3 causes the relay P to hold itself in the following circuit:

Positive terminal of the central voltage source, terminal 10, terminal 10', contact *se*2 and resistor R1 of the calling station in a parallel connection with contact *se*2 and resistor R1 of the called station, terminal 6', terminal 6, contact *p*3 relay P, negative terminal of the central voltage source.

The operation of the relay P causes the contact *p*1 to close so that a negative potential is applied to terminal 7' and the lamps LA*s*, which may be green, of the calling and called stations are energized in the following circuit:

Positive terminal of the central voltage source, terminal 10, terminal 10', contact *se*2, lamp LA*s* of the calling station in a parallel connection with contact *se*2 and lamp LA*s* of the called station, terminal 7', terminal 7, contact *p*1, negative terminal of the central voltage source.

In the other stations the contact *se*2 is not changed over so that their lamps LA*b*, which may be red, are energized there whereas the lamps LA*s* of these stations remain dark because the following circuit is established:

Positive terminal of the central voltage source, terminal 10, terminal 10', parallel connection of contacts *se*2 and blocking relays B of all other stations, terminal 7', terminal 7, contact *p*1, negative terminal of the central voltage source. When contact *se*2 is operated resistor R2 prevents the operation of relay B. However, if relay B has already operated, enough current flows through to maintain relay B regardless of the position of contact *se*2.

The operation of the blocking relay B causes the contact *b*1 to close and causes the lamp LA*b* to be energized in the following circuit:

Positive terminal of the central voltage source, terminal 10, terminal 10', parallel connection of contacts *b*1 and lamps LA*b* of all other stations, terminal 7', terminal 7, contact *p*1, negative terminal of the central voltage source.

The blocking relay B causes also a change-over of the contacts *b*2 and *b*3 in the remaining stations so that the sound transducer SW will be reliably disconnected and the two engaged stations cannot be disturbed by the remaining stations.

The duplex conversation between the calling and called stations can now be conducted without interference. Whoever is talking will press the talking key whereas the listener releases the talking key.

The conversation is terminated by a release of the station-engaging key in at least one of the two stations which have talked to each other. This causes the contacts *se*1 and *se*2 to return to the position shown on the drawing. As a result, the potential is removed from the resistor R1, and holding circuit for relay P, the operating circuit, and all relays and contacts return to their position of rest. When the conversation has thus been terminated, any other stations of the system can establish a connection between them and conduct a conversation.

In an embodiment of the invention, the components had the following values:

Transducer SW—24 ohms (A.C. resistance)
Resistor R3—24 ohms (A.C. resistance)
Amplifier V—Three outputs:

- 32 ohms (A.C. resistance) for connecting up to 10 stations
- 16 ohms (A.C. resistance) for connecting up to 20 stations
- 8 ohms (A.C. resistance) for connecting up to 40 stations
- Voltage source 24 volts D.C. (by conversion from power distribution system)

| | Ohms |
|---|---|
| Ressitor R1 | 3500 |
| Relay B | 850 |
| Resistor R2 | 3000 |
| Relay H | 250 |
| Relay P | 250 |

The system according to the invention is not restricted to the embodiment shown by way of example. An arrangement may be desired, e.g., in which the amplifier cannot be energized by every station. In this case the terminal 5' of such a station is not connected to the terminal 5 of the central amplifier unit. Such a station, which is referred to as a non-calling station, cannot operate the energizing relay E by remote control so that this station can respond and talk, but cannot call.

The arrangement, according to the invention enables the calling and conducting of a conference conversation. For this purpose the contact *k* in the station calling the conference must be operated simultaneously with the contacts of *s*1 and *s*2 of the talking key. This may be affected, e.g., by pressing another key. When the contact *k* is closed, negative potential is applied to the terminal 6' in the following circuit:

Negative terminal of central voltage source, terminal 8, terminal 8', contact *k*, terminal 9' short-circuiting bridge between terminals 9' and 6', terminal 6.

As a result, the negative potential is applied to both sides of the auxiliary relay H so that it is not energized as long as contact *k* is closed. During this time the station-engaging keys of all stations called to the conference are pressed so that the contacts *se*1 and *se*2 in these stations are operated.

When the further key is reelased in the calling station to open the contact *k*, all called stations are simultaneously connected whereas the other stations are disconnected, as has been described hereinbefore.

The circuit arrangement according to the invention enables also a so-called group call, in which the calling voice is heard only in the calling stations of this group whereas the remaining stations of the system are not disturbed by this call.

FIG. 3 shows these essential parts of FIGS. 1 and 2 and the additional means for this arrangement.

In the first place, the galvanic connection between the terminals 9' and 6' is interrupted. This prevents a conference connection, but enables the use of the conference key for the group call.

The terminal 9' is no longer connected to the terminal 6', but to one of the terminals 9*a*, 9*b*, or 9*c* in the present example to terminal 9*c*, associated with one of, e.g., three groups.

Terminals 9*a*, 9*b* and 9*c* are connected to the positive terminal of the central voltage source and the terminal 8' is connected to the negative terminal of the central voltage source.

When the contact *k* is closed, the corresponding group relay, for instance, G*c*, is energized so that the corresponding contact *gc*1 is closed. Contact *gc*1 is connected in parallel to the auxiliary relay contact *h*. At the same time another contact of the corresponding group relay, e.g., the contact *gc*2, is opened whereas the remaining contacts *ga*2 and *gb*2 remain closed.

Hence, the closing of contact *k* causes the following circuit to be established:

Positive terminal of central voltage source, group relay G*c*, terminal 9*c*, terminal 9, contact *k*, terminal 8′, terminal 8, negative terminal of the central voltage source.

The closing of contact *gc* causes relay P to be energized in the following circuit:

Positive terminal of the central voltage source, contact *gc*1, relay P, negative terminal of the central voltage source.

The response of relay P closes the contacts *p*3 and *p*1 so that the circuits described hereinbefore are established.

Loudspeakers may be used in addition to the sound transducers to make the call heard in a loud environment. The conference is conducted as described hereinbefore without such loudspeaker.

The invention is not restricted to the examples which have been described. For instance, the contact of the station-engaging key *se*1 may be replaced by a plurality of contacts for a double-pole control of the input leads of the amplifier.

The leads between the terminals 1′ and 1, and 4′ and 4 may be consisted of single leads or of two leads twisted together. In both cases these leads are preferably shielded individually or as a pair.

In addition to the contacts *b*1, *b*2 and *b*3, the blocking relay B may have another contact, which is included in the circuit of the lamp LA*s* and reliably prevents an energization of this lamp when the station engaging key has been operated, even if the regulation not to make any manipulation when the lamp LA*b* is lighted is not followed.

The leads from the sound transducer to the amplifier need not be four-cored, but may be three-cored. In this case there is one lead having a dual function, e.g., a common return lead.

The transformer T1 may be omitted if the output of the amplifier V is suitably matched.

The central voltage source need not consist of a local D.C. source of 24 volts. A converter may be used for deriving this D.C. voltage from the power distribution system.

The power of the amplifier V must be determined in dependence on the number of stations to be included in the system. Tube amplifiers or, if the components are suitably selected, transistor amplifiers may be used.

The station-engaging contacts *se*1, *se*2 and the talking contacts *s*1, *s*2 need not consist of key-operated contacts. They may be remotely controlled contacts or contacts operated by other means, e.g., in voice-controlled circuits in response to the human voice.

Instead of visual signals produced by signal lamps or in addition to them, an audible signal, e.g., a buzzing sound, may be provided for.

While the principles of the invention have been described above in connection with specific apparatus and applications, it is to be understood that this description is made only by way of example and not as a limitation on the scope of the invention.

What is claimed is:

1. A simplex channel intercommunication comprising a plurality of parallel connected stations, central control means serving said plurality of stations, amplifier means in said central control means, energizing relay means in said central control means for energizing said amplifier means, engaging key means at each of said stations, said engaging key means having first contact means in at least some of said stations operated responsive to the actuation of said engaging key means for completing a circuit to operate said energizing relay, second contact means in each of said stations operated responsive to the actuation of said energizing key for preparing a talking path to said amplifier means to communicatively connect each of said stations to said plurality of stations, auxiliary relay means in said central control means, means in each of said stations for inhibiting the operation of said auxiliary relay means until said engaging key in at least two of said plurality of stations is actuated, a single relay in each of said stations, said single relay operated to block communications at said stations, and test relay means in said central control means operated responsive to said auxiliary relay means for operating said blocking relay means at each of said stations wherein said engaging key is not operated.

2. In the system of claim 1 wherein conferencing contact means are provided at said stations for conferencing said stations, means responsive to the operation of said conference contact means for inhibiting the operation of said auxiliary relay until the said engaging keys in all of said stations in said conference have been operated.

3. In the system of claim 2 wherein said inhibiting means comprises a resistor in each of said stations in series with the auxiliary relay and the power source, means responsive to the operation of said engaging keys in at least two of said stations for paralleling the resistor of said stations.

References Cited

UNITED STATES PATENTS

| | | | |
|---|---|---|---|
| 2,871,303 | 1/1959 | Da Riva | 179—39 |
| 3,219,761 | 11/1965 | Schmitthenner | 179—40 |
| 3,283,077 | 11/1966 | Bayer | 179—40 |

WILLIAM C. COOPER, *Primary Examiner.*

KATHLEEN H. CLAFFY, *Examiner.*

A. H. GESS, *Assistant Examiner.*